United States Patent Office 3,520,941
Patented July 21, 1970

3,520,941
BICYCLOBUTANES AND PREPARATION THEREOF
Mahmound R. Rifi, Kendall Park, N.J., assignor to Union Carbide Corporation, a corporation of New York
No Drawing. Filed Dec. 21, 1965, Ser. No. 515,452
Int. Cl. C07c 23/00, 23/06
U.S. Cl. 260—648                                           1 Claim

ABSTRACT OF THE DISCLOSURE 1,3-substituted bicyclobutanes, which can be processed to useful polymers, prepared by the dehalogenation of cyclic 1,3-dihaloalkanes by electrochemical means.

---

This invention relates to bicyclobutanes. More particularly, the invention relates to certain substituted bicyclobutanes and a method of preparing substituted bicyclobutanes.

Bicyclobutane, more properly bicyclo[1.1.0]butane, has the structure

(I)

and has been prepared from chlorobromocyclobutane by Wiberg "Journal of the American Chemical Society," vol. 81 p. 5261 (1959). The procedure employed in general involved the refluxing of chlorobromocyclobutane in dioxane in the presence of sodium.

Some bicyclobutane derivatives are known. For example, in addition to bicyclo[1.1.0]butane, there can be mentioned ethylbicyclo[1.1.0]butane carboxylate and 1-cyano-3-methylbicyclo[1.1.0]butane. These materials have been prepared only on a laboratory scale and by lengthy, involved procedures. The preparation of ethylbicyclo[1.1.0]butane carboxylate, for instance by reported procedures, involves the preparation of no less than five intermediates. Final yields are reported to be only about 35% (weight basis). While ethylbicyclo[1.1.0]butane carboxylate and other bicyclobutanes have been prepared by complex techniques of synthetic organic chemistry, preparative procedural problems have up to now impeded preparation of many bicyclobutane derivatives which can be envisioned.

It is a primary object, therefore, of the present invention to provide a simple and direct means of preparing derivatives of bicyclobutanes.

It is another object to provide novel 1,3-substituted bicyclobutanes which in turn can be processed to novel and useful polymers.

These and other objects of the present invention are in general achieved by the dehalogenation of cyclic 1,3-dihaloalkanes by electrochemical means. More specifically, it has now been discovered that passing a direct current through a suitable solution of a 1,3-dihalocyclobutane at a voltage sufficient to reduce the carbon-halogen bonds thereof result in the evolution of halogen and the foramtion of a bicyclobutane. Such voltage is preferably 1.5 volts or more. However a lesser voltage than 1.5 volts can be used where desired within the scope of the invention.

In a typical preparation 3 parts of 1,3-dimethyl-1,3-dibromocyclobutane is dissolved in 20 parts of dimethyl-formamide which has been previously saturated with lithium bromide. This solution is contacted with a cathode consisting of a mercury pool in a compartment. The anode, a nichrome wire mounted in a compartment, interconnected with the first compartment by way of a channel, is immersed in dimethylformamide and lithium bromide solution. The anode and cathode are ionically connected i.e., a semi-permeable barrier is placed in the channel between the anode and cathode solutions which permits only the passage of halide (here bromide) ions therethrough from the cathode solution to the anode solution. A D.C. voltage is applied at a level of at least 1.5 volts. Throughout the reaction, nitrogen is sprayed through the cathode zone to carry the bicyclic compound into a cold trap to insure high purity of product. Quantitative yields of 1,3-dimethylbicyclobutane, a new compound, can then be realized.

The electrochemical method of the present invention can be used to prepare bicyclobutanes having the formula

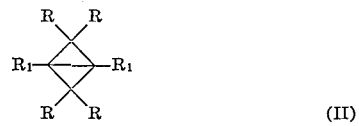

(II)

wherein R is hydrogen or alkyl having from 1 to 10 carbon atoms and $R_1$ is halogen, hydrogen or alkyl having from 1 to 10 carbon atoms by the electrolytic reduction of a cyclobutane composition represented by the formula

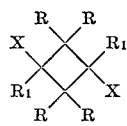

where R and $R_1$ are as indicated above and X is a halogen. In general the alkyl group represented by R or $R_1$ can have from 1 to 10 carbon atoms inclusive, but the size of this substituent is not narrowly critical until its sheer bulk interferes with the reaction. Similarly the alkyl groups can be substituted with other non-hydrocarbon substituents which do not interfere with the reaction e.g., ether oxygen, carboxylic acid groups and the like. Among typical alkyl substituents there can be mentioned methyl, ethyl, propyl, isopropyl, butyl, isobutyl, pentyl, neopentyl, hexyl, heptyl, octyl, 2-ethylhexyl, nonyl, decyl, undecyl and dodecyl groups as well as reaction equivalents of these such as ethoxy, isopropoxy, cyanodecyl, carboxymethyl and similar substituent groups.

The foregoing cyclobutanes are employed in solution in carrying out the above process. Suitable solvents are those which dissolve the starting material, and which dissolve electrolytes. A further requirement is that the solvent does not reduce at a more negative potential than that required to reduce the aforementioned carbon-hydrogen bonds, e.g. a solvent having a half-wave potential of, for example, at least 1.5 volts. Specific examples of suitable solvents are the inert, polar organic solvents such as amides, dimethylformamide, ketones e.g., acetone and cyclohexanones, nitriles such as acetonitriles and dimethyl sulfoxide and dimethyl sulfolane. Water can be used provided the reactant employed will dissolve therein.

To render the solvent electrically conductive an electrolyte is added. These materials are not narrowly critical; all that is required is that the material be an ionizable salt which, as with the solvent, does not reduce at a more negative voltage than the voltage required to reduce the above-mentioned carbon-hydrogen bonds, e.g. a salt having a half-wave potential above, for example, 1.5 volts. Both inorganic and organic salts can be used. Preferred are halide salts of alkali and alkaline earth metals such as KCl, MgCl$_2$, LiCl, KBr, LiBr, NaBr and NaCl. Persulfate salts such as the metal persulfate salts of alkali metals e.g. sodium, potassium or lithium can also be employed. Among organic salts there are quaternary ammonium salts such as tetramethyl- or tetraethylammonium chlorides.

Once the 1,3-dihalocyclobutane reactant is dissolved in the polar solvent containing dissolved electrolyte, the reaction is simply effected by passing a direct current through the solution.

Temperature is in no respect critical to the reaction with wide extremes e.g. −78° C. and 200° C. being suitable. Room temperature e.g. 25° C. of course is simplest and is highly preferred. Pressure is of no consequence in the reaction other than to prevent solvent evaporation if desired.

The materials used to make the electrodes are not critical. In general the anode can be fabricated of any electron acceptor, e.g., any metal or amphoteric substance such as carbon. The cathode, conversely, can be any electron carrier i.e. any metal.

The current employed must be direct current (D.C.). A rectified alternating source is satisfactory. The minimum voltage required to effect the reaction is, as discussed above, the voltage needed to break the carbon-halogen bonds. There is no theoretical maximum voltage.

Included in Compound II prepared by the process of the present invention are the bicyclobutanes represented by the formula

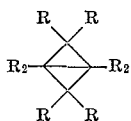

(III)

wherein R is as previously indicated and $R_2$ is halogen or alkyl having from 1 to 10 carbon atoms with the proviso that R is alkyl when $R_2$ is halogen and R is hydrogen when $R_2$ is alkyl.

Compound II of the invention polymerizes cationically using $BF_3$, $PF_5$ or other cationic catalysts. Polymerization can be carried out with or without solvent, at low or moderate temperatures, for example, from 0° to −78° C. The polymer can be represented by the basic repeating unit

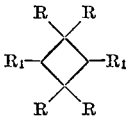

(IV)

where R and $R_1$ are as indicated above. The polymer can be cast as a film from carbon tetrachloride. The cyclobutane film has been found to be resistant to oxidation, ultraviolet light and weathering in general and can be used, for example, for packaging and window panes. Moreover the above film has been found to have the characteristics of high permeability and thus can be used in filtering systems.

Included in Compound IV, above, are the polymers represented by the basic repeating unit

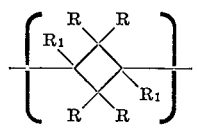

wherein R and $R_1$ are as indicated above with the proviso that R is alkyl when $R_1$ is halogen and R is hydrogen when $R_1$ is alkyl or hydrogen.

Compound II of the invention also reacts with $SO_2$ at temperatures below 0° C. to form the corresponding polysulfones having the basic repeating unit

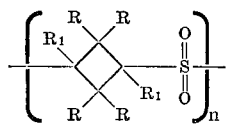

wherein R and $R_1$ are as indicated above and $n$ represents the degree of polymerization and has a value sufficiently high to represent a normally solid polymer.

The carbon atoms at the bridged bond of Compounds II and III are highly reactive, particularly when substituted with polar substituents. The substituents are readily added to the above compounds particularly the 1,3-dihalobicyclobutanes such as 2,2,4,4-tetramethyl-1,3-dichlorobicyclobutane represented by the formula

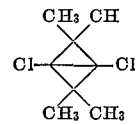

(V)

to ultimately form polar bicyclobutanes.

Thus Compound V reacts with carboxylic acids such as propionic acid to form the intermediate compound 2,2,4,4-tetramethyl-1,3-dichloro-1-propionylcyclobutane having the formula

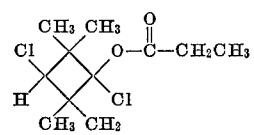

which compound is electrolytically reduced to 2,2,4,4-tetramethyl - 1-propionylbicyclobutane, a novel polar bicyclic compound, represented by the formula

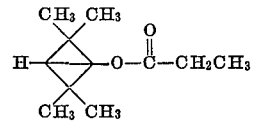

Related polar bicyclic compounds represented by the formula

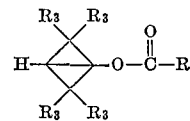

wherein R is alkyl having from 1 to 10 carbon atoms or hydrogen and $R_3$ is alkyl having from 1 to 10 carbon atoms are similarly formed.

Compound V also reacts with hydrogen cyanide or sodium cyanide to give the intermediate compound 2,2,4,4 - tetramethyl-1,3-dichloro-1-cyanocyclobutane represented by the formula

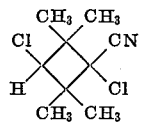

which compound is electrolytically reduced to 2,2,4,4-tetramethyl-1-cyanobicyclobutane a novel polar bicyclic compound represented by the formula

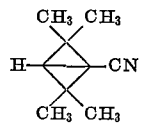

Related bicyclic compounds having the formula

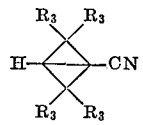

wherein $R_3$ is alkyl having from 1 to 10 carbon atoms are similarly formed.

Compound V further reacts with hydrochloric acid to form the intermediate compound 2,2,4,4-tetramethyl-1,3,3-trichlorocyclobutane represented by the formula

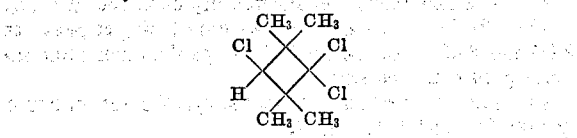

which compound is electrolytically reduced to 2,2,4,4-tetramethyl-1-chlorobicyclobutane, a novel polar bicyclic compound, represented by the formula

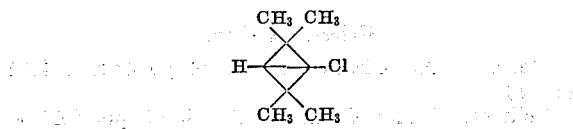

Related bicyclic compounds having the formula

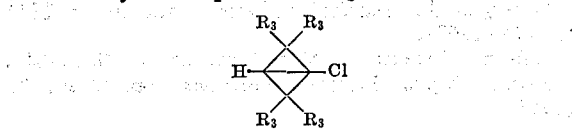

wherein $R_3$ is alkyl having from 1 to 10 carbon atoms are similarly formed.

Compound V reacts with alcohols to form the intermediate compound 2,2,4,4-tetramethyl-1,3-dichlorocyclobutylether having the formula

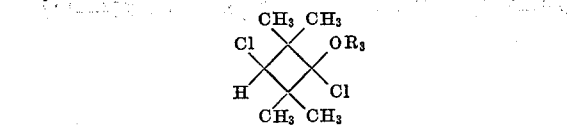

wherein $R_3$ is as indicated above, which compound is electrolytically reduced to a novel polar bicyclic compound 2,2,4,4-tetramethylbicyclobutylether represented by the formula

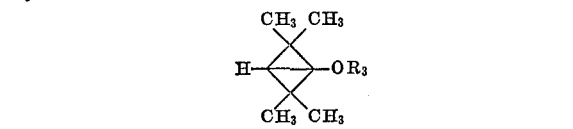

wherein $R_3$ is as indicated above. Related bicyclic compounds having the formula

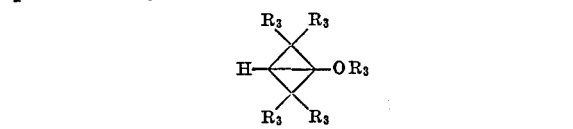

wherein $R_3$ is an alkyl having from 1 to 10 carbon atoms are similarly formed.

The polar bicyclic compounds described above, particularly the compounds having the cyano and ester substituents, polymerize with or without a catalyst, with or without solvent, at room temperature or below to $-78°$ C. or even lower temperatures. The catalyst employed is suitably a free radical one such as benzoyl peroxide.

The following examples serve to illustrate the present invention but are not intended as a limitation or restriction thereof. All parts and percentages are by weight unless otherwise stated.

EXAMPLE I 1,3-dimethylbicyclobutane having the formula

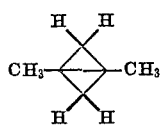

was prepared from 1,3-dimethyl-1,3-dibromocyclobutane as follows:

About 25 grams of 1,3-dimethyl-1,3-dibromocyclobutane was dissolved at room temperature in 125 ml. of dimethylformamide which had been previously saturated with lithium bromide. This solution was introduced to a cathode compartment consisting of a mercury pool in a vessel. The anode, a nicrome wire mounted in an ionically interconnected vessel, was immersed in dimethylformamide and lithium bromide solution. A D.C. voltage was applied to produce a cathode voltage of between 1.8 to 3.0 volts and the product, 1,3-dimethylbicyclobutane, was formed in the cathode compartment. Nitrogen was concurrently passed through the cathode solution to carry the bicyclic product, B.P. 54° C., into a cold trap for recovery. A yield of product, 1,3-dimethylbicyclobutane, in excess of 85% of theoretical was obtained in about 6 hours.

The above reaction time is shortened, however, by increasing the above cathode voltage. Thus the above yield of product is obtained in about 3 hours where the cathode voltage is adjusted to about 6.0 volts.

The product was proved to be 1,3-dimethylbicyclobutane by:

(1) The fact that it reacts with $Br_2$ dissolved in $CCl_4$ to give the starting material.

(2) N.M.R. (nuclear magnetic resonance) and infrared spectral analysis show the absence of vinyl protons.

The N.M.R. spectra show only 3 singlet peaks at 8.64, 9.0 and 9.48 with intensities of 3:1:1 respectively. The peak at 8.64 with an intensity of 3 is due to methyl groups which are equivalent. The peaks at 9.0 and 9.48 T are methylene protons which are nonequivalent.

EXAMPLE II 1,3-dimethylbicyclobutane, prepared as indicated in Example I was polymerized as follows:

About 2 ml. of pure 1,3-dimethylbicyclobutane was introduced at room temperature into a dry test tube, capped by a syrum stopper, by means of a syringe inserted through the stopper. The solution was then cooled to $-78°$ C. by means of a Dry Ice-acetone bath. About 5 ml. of boron trifluoride gas at atmoshperic pressure was bubbled into the liquid. The solution acquired an orange color immediately and thickened. The solution was allowed to stand at $-78°$ C. for about 16 hours and then 10 ml. (excess) of methanol was added to take up the monomer causing the polymer to precipitate as a white solid. The polymer was purified by dissolving it in 2 ml. of carbon tetrachloride and precipitating it again by adding 10 ml. of methanol.

The above polymer is also prepared at temperatures above $-78°$ C. at increased rates. Thus the monomer, 1,3-dimethylbicyclobutane is polymerized at 0° C. in about 2 hours.

Nuclear magnetic resonance spectra (N.M.R.) and infrared spectra were consistent with the basic repeating unit

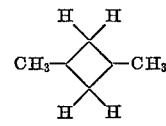

Reduced viscosity (0.1 gram dissolved in 100 milliliters of carbon tetrachloride and measured at 25° C.) was 0.5.

EXAMPLE III

The precursor compound, 2,2,4,4-tetramethyl-1,1,3,3-tetrachlorocyclobutane, from which Compound V was prepared by the electrolytic reduction procedure of Example I, was prepared as follows:

A 2 liter, 3-necked flask equipped with a mechanical stirrer, a condenser and a half inch diameter rubber tube was charged with 5000 grams of phosphorus pentachloride and 1000 ml. of carbon tetrachloride. The mixture was heated to reflux temperature and 100 grams of tetramethyl-1,3-cyclobutane dione was added slowly via the rubber tube with stirring being applied to the mixture. Thereafter the reaction solution was refluxed for about 3 hours. The carbon tetrachloride was distilled at atmospheric pressure and the residue of the mixture was poured slowly over about 1000 grams of ice and a thick yellowish oil precipitated. This was filtered and recrystallized from a solution of 200 ml. methanol and 300 ml. ethanol to give a white waxy material identified by N.M.R. and I.R. spectra and elemental analysis as 1,1,3,3-tetramethyl 2,2,4,4-tetrachlorocyclobutane represented by the formula

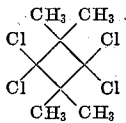

which was recovered in a 65% yield and melted at about 233° C.

Compound V was thereafter prepared from the above cyclobutane as follows. About 15 grams of 2,2,4,4-tetramethyl-1,1,3,3,-tetrachlorocyclobutane was dissolved in 225 ml. of dimethylformamide which had been previously saturated with lithium bromide. This solution was introduced to a cathode compartment such as that described in Example I. The anode was also of the type described in Example I and contained about 225 ml. of dimethylformamide saturated with lithium bromide. A D.C. voltage was applied to produce a cathode voltage of about 2.0 volts for 3 days. The cathode solution was then distilled at about 10 mm. of mercury to remove substantially all the dimethylformamide and recover the product, Compound V, as a colorless liquid residue in a yield of 85% of theoretical.

The identity of the bicyclic product was proved by:
(1) The fact that it decolorizes $Br_2$ dissolved in $CCl_4$.
(2) The N.M.R. spectra shows only 2 singlet peaks at 8.00 and 8.42 T for the methyl groups thus indicating no vinyl groups are present.
(3) The I.R. spectrum shows the cyclobutane structure at 900, 960 and 1450 cm.$^{-1}$.

What is claimed is:
1. 2,2,4,4 - tetramethyl - 1,3-dichlorobicyclo[1.1.0] butane.

References Cited

Maher, "J. Am. Chem. Soc." vol. 84, pp. 4600 to 4601 (1962).
Vellturo, "J. Am. Chem. Soc.," vol. 87, pp. 3021 to 3022 (1965).
Wiberg et al., "Tetrahedron Letters," vol. 30, pp. 2173 to 2175 (1963).
Coburn, "Dissertation Abstr.," vol. 25, p. 828 (1964).
Allen, "Organic Electrode Processes," pp. 13 and 91 (1958).

LEON ZITVER, Primary Examiner

H. T. MARS, Assistant Examiner

U.S. Cl. X.R.

260—2, 33.8, 79.3, 464, 468, 488, 611, 666; 204—128

PO-1050
(5/69)

UNITED STATES PATENT OFFICE
CERTIFICATE OF CORRECTION

Patent No. 3,520,941      Dated July 21, 1970

Inventor(x) Mahmoud R. Rifi

It is certified that error appears in the above-identified patent and that said Letters Patent are hereby corrected as shown below:

In the Heading the first name of the inventor should read --Mahmoud--.

SIGNED AND
SEALED
DEC 15 1970

(SEAL)
Attest:

Edward M. Fletcher, Jr.
Attesting Officer

WILLIAM E. SCHUYLER, JR.
Commissioner of Patents